United States Patent [19]

Graafland

[11] Patent Number: 4,721,760

[45] Date of Patent: Jan. 26, 1988

[54] WATER-SOLUBLE SACCHARIDE POLYMERS

[75] Inventor: Teunis Graafland, Amsterdam, Netherlands

[73] Assignee: Shell Oil Company, Houston, Tex.

[21] Appl. No.: 38,672

[22] Filed: Apr. 15, 1987

[30] Foreign Application Priority Data

May 1, 1986 [GB] United Kingdom ............... 8610719

[51] Int. Cl.$^4$ .............................................. C08F 1/00
[52] U.S. Cl. ............................................. 526/238.23
[58] Field of Search ................................. 526/238.23

[56] References Cited

U.S. PATENT DOCUMENTS 4,451,629  5/1984  Tanaka ........................ 526/238.23
4,563,497  1/1986  Masanek ........................... 526/200

*Primary Examiner*—Paul R. Michl
*Assistant Examiner*—Patrick A. Doody

[57] ABSTRACT

Water-soluble vinyl saccharide copolymers derived from a water-soluble vinyl saccharide monomer and a water-soluble cationic monomer. Said copolymers can be prepared via a free-radical initiated copolymerization of said monomers at a temperature in the range of 0° C.–95° C., and are useful in enhanced Oil Recovery (EOR) and as water treating agents.

9 Claims, No Drawings

WATER-SOLUBLE SACCHARIDE POLYMERS

BACKGROUND OF THE INVENTION

1. Field of the Invention

The present invention relates to water-soluble saccharide copolymers, more in particular to certain water-soluble monovinyl saccharide copolymers, and to their preparation and use.

2. Description of the State of the Art

Water-soluble polymers such as polysaccharides are being used in a wide range of applications, such as in water treatment, in enhanced oil recovery, and as additives, e.g., in the paper industry. Such polysaccharides are normally microbiologically prepared using certain polysaccharide producing microorganisms like *Xanthomonas Campestris.*

It has now been found that very useful water-soluble saccharide polymers can be prepared synthetically, in particular certain vinyl saccharide copolymers carrying cationic groups, derived from a water-soluble monovinyl saccharide monomer and water-soluble cationic monomer. These copolymer are believed to be novel.

SUMMARY OF THE INVENTION

Accordingly, the invention provides water-soluble vinyl saccharide copolymers derived from a water-soluble monovinyl saccharide monomer and a water-soluble cationic monomer.

The term monovinyl saccharide monomer in this application refers to mono- or disaccharide compounds containing one polymerizable vinyl group. A mon-saccharide is commonly understood in the chemical arts to be a carbohydrate that cannot be hydrolyzed to simpler compounds, while a di-saccharide is a carbohydate that can be hydrolyzed to two mono-saccharide molecules. Polysaccharides, such as cellulose and starch, are naturally occurring polymers which can be hydrolyzed to many monosaccharide molecules. "Saccharide monomer" as that term is used in describing the present invention is to be understood to mean "monomers which are mono- or di-saccharide compounds, containing at least one polymerizable vinyl group." The term cationic monomer refers to a compound having an olefinically unsaturated polymerizable group and a cationic group.

The water-soluble monovinyl saccharide monomers, from which the copolymers of the present invention may be derived include those wherein the polymerizable vinyl group is a vinyloxy or a vinylcarbonyloxy group. Suitably such vinyloxy group-containing monosaccharide compounds include: 3-O-vinyl-D-glucose, 6-vinyl-D-glactose, 1-O-vinyl-L-sorbose and the like.

The group of polymerizable monosaccharide compounds bearing a vinylcarbonyloxy group include compounds such as 3-O-acryloyl-D-glucose, 3-O-methacryoyl-D-glucose, 6-O-acryloyl-D-galactose, 6-O-methacryloyl-D-galactose, 1-O-acryloyl-L-sorbose, 1-O-methacryloyl-L-sorbose, 1-O-acryloyl-mannose, 1-O-methacryloyl-mannose and the like.

Methods for the preparation of the polymerizable water-soluble vinyloxy group-containing monosaccharides have been disclosed by, e.g., Reppe et al, in *Annalen,* 1956, 601, 81 and Watanabe and Colon in *J. Amer. Chem. Soc.,* 1957, 79, 2828. A method for the preparation of the polymerizable water-soluble vinylcarbonyloxy group containing monosaccharides has been disclosed by Black et al, *Makromol. Chem.* 117 (1968), 210.

The preferred monovinyl saccharide monomer is a vinylcarbonyloxy group-containing saccharide monomer, because it is known that it is more difficult to prepare high molecular weight polymers employing a vinyloxy group-containing saccharide monomer. Within the group of water-soluble vinylcarbonyloxy group-containing saccharide monomers there is a preference for a monomethacryloyl group-containing saccharide monomer as it is thought that they will result in water-soluble polymers which generally are hydrolytically more stable than the corresponding acrylic acid-based products. Particularly preferred is 3-O-methacryloyl-D-glucose.

The polymerizable olefinically unsaturated group in the water-soluble cationic monomer is preferably a vinyl, a vinyloxy, a vinylcarbonyl or a vinylcarbonyloxy group and the like.

The cationic group in said cationic monomer is suitably a quaternary ammonium group or a salt of an amino group. The nature of said amino group is not critical and includes conventional cationic monomers known in the art, such as primary, secondary and tertiary alkyl and/or aryl amino groups as well as heterocylic amino groups, e.g., containing up to 20 carbon atoms.

Suitably such vinyl group-containing cationic monomers include monovinylpyridines such as 2-vinylpyridine, 3-vinylpyridine, 4-vinylpyridine and substituted monovinylpyridines such as 2-methyl-5-vinylpyridine and the like.

Vinylcarbonyl group-containing cationic monomers include compounds such as methacryloylamidopropyl trimethyl ammonium chloride and acryloylamidopropyl trimethyl ammonium chloride.

Vinylcarbonyloxy group-containing cationic monomers are preferably selected from the group consisting of 2-(methacryloyloxy)ethyl trimethyl ammonium chloride, 2-(acryloyloxy)ethyl trimethyl ammonium chloride, 2-(methacryloyloxy)ethyl trimethyl ammonium methyl sulfate, 2-(acryloyloxy)ethyl trimethyl ammonium methyl sulfate, 2-(methacryloyloxy)ethyl dimethyl ammonium hydrochloride, 3-(acryloyloxy)propyl dimethyl ammonium hydroacetate, 2-(acryloyloxy)ethyl dimethyl cetyl ammonium chloride and 2-(methacryloyloxy)ethyl diphenyl ammonium chloride. Vinylcarbonyl and vinylcarbonyloxy group-containing cationic monomers are preferred.

Another species of water-soluble cationic monomer, from which the polymer of the present invention may be derived, is diallyl dimethyl ammonium chloride.

The composition of the polymers of the present invention may vary over a wide range and will primarily be determined by the performance requirements of the ultimate polymer enduse. Hence the polymers may include those which are predominantly polyvinylsaccharide polymers, i.e., polymers having a relatively low cationic group content, e.g., 10%, as well as polymers having a relatively low number of saccharide groups, e.g., 35%.

The invention further provides a composition comprising water and at least a copolymer as hereinbefore described. Such a composition is, for example, a water-in-oil emulsion comprising at least a copolymer as hereinbefore described. Other water-soluble polymers such as the biologically prepared polysaccharide may be present in such composition together with a copolymer as hereinbefore described.

The invention also provides a process for the preparation of these novel water-soluble cationic vinyl saccharide polymers, wherein at least a water-soluble monovinyl saccharide monomer and at least a water-soluble cationic monomer are copolymerized at a temperature in the range of from 0° C.–95° C. in the presence of a free-radial initiator.

The free-radicals to be used in the process of the present invention may originate from compounds which are capable of generating free-radicals via a reduction-oxidation reaction, so called redox initiators, as well as from compounds which are capable of generating free-radicals by decomposition, e.g., upon heating thereof. Redox initiator systems have been described, e.g., in *Prog. Polym. Sci.*, Vol. 8, pp. 61–131 (1982). Preferred redox initiator systems are selected from the group comprising a peroxide, a persulfate, a peroxydiphosphate or a permanganate type of oxidant, and a reducing agent, such as one based on a reducing acid of sulfur. Compounds which are capable of generating free-radicals via a decomposition reaction have been described, e.g., in *J. Macromol. Sci. Rev. Macromol. Chem.*, C 20(a), 149–205 (1981) and include conventional types of compounds, including azo and diazo compounds, organic peroxides, hydroperoxide, peroxydicarbonate and persulfate type of free-radical initiators, and hydrogen peroxide. Preferred redox initiator systems are those based on hydrogen peroxide or on a persulfate, e.g., an alkali metal or ammonium persulfate, in combination with a salt of a reducing acid of sulfur, such as sodium disulfite ($Na_2S_2O_5$), sodium dithionite ($Na_2S_2O_4$), sodium thiosulfite ($Na_2S_2O_3$), sodium formaldehyde sulfoxylate and the like.

Should the performance requirements of the ultimate polymer enduse be such that they require the polymer of the present invention to have a high molecular weight, it may be advantageous to use in the process of the present invention a free-radical initiator of limited solubility in water, e.g., a solubility in water of less than 2500 $\mu$mol/kg at 20° C., 2,2'-azobisisobutyronitrile is a preferred free-radical initiator. The amount of free-radical or redox initiator to be used in the preparation of the polymers of the present invention may vary over wide ranges. In the preparation of high molecular weight polymers, however, there should be a limit to the amount of free-radical or redox initiator used, e.g., the molar ratio of water-soluble monomer—i.e., monovinyl saccharide monomer and cationic monomer—to free-radical initiator or the oxidant compound of a redox initiator system is preferably at least 100:1 and more preferably at least 500:1. When employing a free-radical initiator of low water-solubility it is advantageous to add said initiator as a solution in a water-miscible solvent such as acetone.

The aqueous polymer solution may become quite viscous due to the viscosifying power of the copolymer produced. Therefore the monovinyl saccharide monomer is suitably present in water in a concentration which is not higher than 150 kg/m³ and preferably not higher than 120 kg/m³.

The copolymers according to the present invention may be employed as water thickeners, e.g., in flooding water which is applied in the enhanced oil recovery. Another important outlet for these polymers is in water treatment, e.g., as coagulant and/or flocculant. They may also be applied, e.g., as additive in the paper industry and as paint thickener.

The invention will be further illustrated by the following Examples, for which the following information is provided.

a Abbreviations used:

| Code | Chemical Name |
|---|---|
| MG | 3-O-methacryloyl-D-glucose |
| DIMG | 1,2:5,6-di-O-isopropylidene-3-O-methacryloyl-D-glucose |
| MAPTAC | 3-(methacryloyloxy)propyl trimethyl ammonium chloride |
| DMAEM HCl | 2-(methacryloxy)ethyl dimethyl ammonium chloride |
| AIBN | 2,2'-azobisisobutyronitrile | b Preparation of MG 4 g of 1,2:5,6-di-O-isopropylidene-3-O-methacryloyl-D-glucose (DIMG), 25 mg of p-methoxyphenol and 30 ml 0.5N HCl were introduced into a 100 ml glass reactor equipped with a glass stirrer, a thermometer and a reflux condensor, and subsequently the reactor was placed in a thermostated oil-bath. The reactor contents were heated to 70° C. with continuous stirring, and maintained at this temperature until the contents had become homogeneous (1–2 h). After cooling to room temperature the reactor contents were transferred to a separatory funnel. To remove the p-methoxyphenol, the 3-O-methacryloyl-D-glucose solution was treated with 50 ml diethyl ether and after phase separation had occurred the organic phase was removed. This extraction procedure was repeated four times. Subsequently the aqueous solution was transferred to the above-mentioned 100 ml glass reactor and a pressure slightly below atmospheric was applied to remove the last traces of diethyl ether. Finally the solution was neutralized to a pH of 7 with 1.0N NaOH, which procedure was carefully monitored by pH measurement. A solids determination indicated that the MG content of the aqueous solution was 8% w (=0.32 mol/l).

c Removing the inhibitor from the cationic monomer

The polymerization inhibitor present in the aqueous cationic monomer solutions were removed by extraction with diethyl ether according to the procedure as described in section b.

d Measuring the viscosity of the aqueous polymer solutions

The viscosity of the aqueous polymer solutions was measured at 25° C. using a Contraves low shear viscometer at a shear rate $\gamma$ which was varied over a range of from 0.0746–7.46 s$^{-1}$.

e Determining the flocculation/coagulation efficiency of the polymers prepared e-1 Preparation of colloidal suspensions A colloidal SiO$_2$ suspension (Synton—W30, mean particle size 0.125 $\mu$m, ex Monsanto) and a colloidal Bentonite suspension (mean particle size 1–2 $\mu$m, ex Magocel) were diluted with commercial buffer solutions of pH 4 and/or 7 and also with demineralized (demi) water, to arrive at suspensions containing 4.32 g/l of SiO$_2$ or bentonite. The pH values of the demi water-based suspensions were 8.9 and 9.6 for SiO$_2$ and bentonite, respectively. A colloidal Al$_2$O$_3$ suspension (Martoxin GL-1, mean particle size 0.5 $\mu$m, ex Martins Werk was diluted with only demi water to arrive at a suspension containing 4.32 g Al$_2$O$_3$/l and having a pH of 9.6.

e-2 Sample preparation for flocculation testing

The flocculation tests were carried out in a 100 ml calibrated glass tube (internal diameter: 30 mm) having a cone-shaped closed end (volume: 25 ml, i.e., 25% w of total volume). 50 ml of the $SiO_2$, bentonite or $Al_2O_3$ suspensions prepared as in section e-1 were introduced into the tubes together with so much of a 0.1% w aqueous polymer solution to arrive at polymer/$SiO_2$, bentonite or $Al_2O_3$ weight ratio's as indicated in Tables 4–6 hereinafter. After homogenizing the tube contents (on a roller table) they were stored in a vertical position at ambient temperature.

e-3 Measuring the flocculation/coagulation efficiency

The flocculation efficiency was determined by measuring the clarity of the liquid phase of said suspensions relative to that of water in a spectrophotometer at regular intervals. Simultaneously for a number of systems the sediment volume (ml) in the hereinbefore mentioned tubes was also measured.

EXAMPLES I–IV

MG/DMAEM HCl 8/2 and MG/MAPTAC 8/2, 6/4 AND 4/6 copolymers

1. Copolymer preparation 50 ml of an aqueous monomer solution containing 8% w of a monomer mixture comprising MG and DMAEM.HCl or MAPTAC in a molar ratio as indicated in Table 1 hereinafter, and AIBN in a monomer/AIBN molar ratio also as indicated in Table 1, were introduced into a 100 ml glass reactor. With mild stirring and a $N_2$purge the reactor contents were heated at 40° C. for 48 hours. Subsequently the reactor contents were cooled and poured out under continuous stirring in approximately 150 ml ethyl alcohol, whereupon a white precipitate was obtained. After removing the liquid phase, the residue was dried under reduced pressure at 50° C. to constant weight. The ultimate products were white, water-soluble powders.

2. Viscosifying properties of polymers prepared

The viscosifying properties of the polymers were determined by measuring the viscosity of the aqueous polymer solutions following the procedures as hereinbefore described in section d. The resulting viscosity data are given in Tables 2 and 3.

3. Flocculation/coagulation efficiency of polymers prepared

The flocculation and coagulation efficiency of the polymers was determined by the procedures as hereinbefore described in section e. The resulting data is given in Tables 4–6.

From the Examples it will be clear that the copolymers according to the present invention appear to possess a considerable viscosifying power and ability to act as flocculants and coagulants.

TABLE 1

| Example | CATIONIC Monomer | MG/CATIONIC monomer molar ratio | Monomer/ AIBN molar ratio | Copolymer composition according to $^{13}C$—NMR MG/CATIONIC monomer |
|---|---|---|---|---|
| I | DMAEM · HCl | 80:20 | 1000:1 | 85:15 |
| II | MAPTAC | 80:20 | 1000:1 | 87:13 |
| III | " | 60:40 | 665:1 | 68:32 |
| IV | " | 40:60 | 500:1 | 39:61 |

TABLE 2

| Copolymer concentration % w | NaCl concentration % w | Viscosity (mPa.s) at 25° C. and $\dot{\gamma} = 7.46\ s^{-1}$ (Example) | | | |
|---|---|---|---|---|---|
| | | I | II | III | IV |
| 0.05 | 0 | 12.4 | 12.0 | 11.8 | 13.3 |
| 0.1 | 0 | 39.8 | 27.2 | 26.5 | 27.4 |
| 0.25 | 0 | 78.8 | 65.5 | 55.5 | 54.3 |
| 0.25 | 0.1 | 9.7 | 7.9 | 5.18 | 4.88 |
| 0.25 | 1.0 | 3.8 | 3.1 | 2.17 | 1.97 |
| 0.25 | 3.0 | 3.3 | 2.9 | 1.84 | 1.69 |
| 0.5 | 0 | 184.6 | 137 | 105 | 98.1 |
| 1.0 | 0 | 381 | 268 | 189 | 172 |

TABLE 3

| $\dot{\gamma}\ s^{-1}$ | Viscosity (mPa.s) at 25° C. of aqueous solutions containing 1% w polymer (Example) | | | |
|---|---|---|---|---|
| | I | II | III | IV |
| 0.0746 | 1410 | 700 | 258 | 213 |
| 0.346 | 1113 | 606 | 248 | 204 |
| 1.607 | 722 | 448 | 233 | 196 |
| 4.04 | 502 | 337 | 212 | 186 |
| 7.46 | 381 | 268 | 184 | 172 |

TABLE 3

| $\dot{\gamma}\ s^{-1}$ | Viscosity (mPa.s) at 25° C. of aqueous solutions containing 1% w polymer (Example) | | | |
|---|---|---|---|---|
| | I | II | III | IV |
| 0.0746 | 1410 | 700 | 258 | 213 |
| 0.346 | 1113 | 606 | 248 | 204 |
| 1.607 | 722 | 448 | 233 | 196 |
| 4.04 | 502 | 337 | 212 | 186 |
| 7.46 | 381 | 268 | 184 | 172 |

TABLE 4

| Copolymer mg/g $SiO_2$ | Transmission (%) of silica suspension after 4 hours* Example | | | | | | | | | | | |
|---|---|---|---|---|---|---|---|---|---|---|---|---|
| | I | | | II | | | III | | | IV | | |
| | pH 4 | 7 | 8.9 | 4 | 7 | 8.9 | 4 | 7 | 8.9 | 4 | 7 | 8.9 |
| 1 | 5 | 5 | | | 5 | 9 | 3 | | | | 3 | |
| 5 | 25 | 4 | | | 5 | 6 | 2 | | | | 2 | |
| 8 | 88 | 3 | 3 | 3 | 7 | 1 | | 2 | | | 3 | |
| 10 | 97 | 2 | 14 | 15 | 4 | 15 | 31 | 1 | 13 | 7 | 6 | 27 |
| 12 | 95 | 2 | | 82 | 2 | 97 | | 9 | | 52 | 37 | |
| 15 | 97(1.7)** | 2 | | 93(1.7)** | 5 | | 99(3.5)** | 37 | | 85(3.6)** | 52 | |

TABLE 4-continued

| Copolymer | Transmission (%) of silica suspension after 4 hours* Example | | | | | | | | | | | |
|---|---|---|---|---|---|---|---|---|---|---|---|---|
| | I | | | II | | | III | | | IV | | |
| mg/g SiO$_2$ pH | 4 | 7 | 8.9 | 4 | 7 | 8.9 | 4 | 7 | 8.9 | 4 | 7 | 8.9 |
| 20 | | 18 | | | 20 | | | 21 | | | 88 | |

*Transmission relative to that of water.
**Sediment height in ml.

TABLE 5

| Copolymer | Transmission (%) of Al$_2$O$_3$ suspensions after 4 hours* Example | | | |
|---|---|---|---|---|
| mg/g Al$_2$O$_3$ | I | II | III | IV |
| 0.1 | 1 | 1 | 54 | 69 |
| 0.25 | 1 | 23 | 82 | 87 |
| 0.5 | 2 | 57 | 90 | 92 |
| 1.0 | 21 | 99 | 88 | 87 |
| 2 | 29 | 99 | 68 | 20 |
| 5 | 55 | 86 | 51 | 19 |
| 8 | 25 | 74 | 17 | 3 |
| 10 | 25 | 33 | 12 | 9 |
| 15 | 1 | 25 | 5 | 1 |

*Transmission relative to that of water.

TABLE 6

| Copolymer | Transmission (%) of Bentonite suspensions after 4 hours* Example | | | | | | | |
|---|---|---|---|---|---|---|---|---|
| | I | | II | | III | | IV | |
| mg/g Bentonite pH | 4 | 9.6 | 4 | 9.6 | 4 | 9.6 | 4 | 9.6 |
| 5 | 1 | 1 | 1 | 1 | | | 31 | 9 |
| 10 | 1 | 2 | 2 | 2 | 3 | 3 | 52 | 35 |
| 20 | 3 | 3 | 3 | 3 | | | 82 | 75 |
| 35 | 7 | 10 | 7 | 7 | 79 | 43 | 97 | 95 |
| 50 | 13 | 21 | 16 | 11 | 97 | 66 | 99 | 99 |

*Transmission relative to that of water.

What is claimed is:

1. A water-soluble vinyl saccharide copolymer derived from a water-soluble monovinyloxy- or minivinylcarbonyloxymono-or di-saccharide monomer and a water-soluble cationic monomer selected from a vinyl, vinyloxy, vinylcarbonyl and vinylcarbonyloxy group-containing cationic monomer.

2. A copolymer according to claim 1 wherein the water-soluble monovinyl saccharide monomer is 3-O-vinyl-D-glucose, 6-vinyl-D-galactose, 1-O-vinyl-L-sorbose, 3-O-acryloyl-D-glucose, 3-O-methacryoyl-D-glucose, 6-O-acryloyl-D-galactose, 6-O-methacryloyl-D-galactose, 1-O-acryloyl-D-galactose, 6-O-methacryloyl-D-galactose, 1-O-acryloyl-L-sorbose, 1-O-methacryloyl-L-sorbose, 1-O-acryloxyl-mannose and 1-O-methacryloyl-mannose.

3. A copolymer according to claim 1, in which the water-soluble monovinyl saccharide monomer is a vinylcarbonyloxy group-containing saccharide monomer.

4. A copolymer according to claim 1, in which the vinyl-carbonyloxy group-containing saccharide monomer is a monomethacryloyl or a monoacryloyl group-containing a saccharide monomer.

5. A copolymer according to claim 3, in which the monomethacryloyl group-containing saccharide monomer is 3-O-methacryloylD-glucose.

6. A copolymer according to claim 1, in which the vinylcarbonyloxy group-containing cationic monomer is selected from the group consisting of 2-(methacryloyloxy)ethyl trimethyl ammonium chloride, 2-(acryloyloxy)ethyl trimethyl ammonium chloride, 2-(methacryloyloxy)ethyl trimethyl ammonium methyl sulfate, 2-(acryloyloxy)ethyl trimethyl ammonium methyl sulfate, 2-(methacryloyloxy)ethyl dimethyl ammonium hydrochloride, 3-(acryloyloxy)propyl dimethyl ammonium hydroacetate, 2-(acryloyloxy)-ethyl dimethyl cetyl ammonium chloride and 2-(methacryloyloxy)ethyl diphenyl amonium chloride.

7. A copolymer according to claim 1, in which the cationic monomer is diallyl dimethyl ammonium chloride.

8. A copolymer according to claim 1 wherein the water-soluble monovinyl saccharide in 3-O-methacryloyl-D-glucose and the water-soluble cationic monomer is diallyl dimethyl ammonium chloride.

9. A composition comprising water and at least a copolymer according to any one of the claims 1, 2-5, 6-7 or 8.

* * * * *